United States Patent [19]

Underwood et al.

[11] Patent Number: 5,840,362
[45] Date of Patent: Nov. 24, 1998

[54] METHOD OF REMOVING HYDROCARBONS FROM LIQUID SMOKE COMPOSITIONS

[75] Inventors: Gary L. Underwood, Manitowoc; Jeffrey J. Rozum, Madison, both of Wis.

[73] Assignee: Red Arrow Products, Inc., Manitowoc, Wis.

[21] Appl. No.: 899,226

[22] Filed: Jul. 23, 1997

Related U.S. Application Data

[63] Continuation of Ser. No. 536,948, Sep. 29, 1995, abandoned.

[51] Int. Cl.⁶ .............................. A23L 1/015; A23L 1/232
[52] U.S. Cl. ..................... 426/650; 210/692; 426/422; 426/490
[58] Field of Search .................................. 426/250, 271, 426/422, 650, 490, 534; 210/690, 692, 661

[56] References Cited

U.S. PATENT DOCUMENTS

| | | |
|---|---|---|
| 3,106,473 | 10/1963 | Hollenbeck . |
| 4,359,481 | 11/1982 | Smits et al. ............................. 426/650 |
| 4,446,167 | 5/1984 | Smith et al. ............................. 426/650 |
| 4,504,501 | 3/1985 | Nicholson ................................ 426/650 |
| 4,959,232 | 9/1990 | Underwood ............................. 426/271 |
| 4,994,297 | 2/1991 | Underwood et al. ................... 426/650 |
| 5,039,537 | 8/1991 | Underwood ............................. 426/271 |
| 5,270,067 | 12/1993 | Underwood et al. ................... 426/138 |
| 5,292,541 | 3/1994 | Underwood et al. ................... 426/250 |
| 5,397,582 | 3/1995 | Underwood et al. ................... 426/250 |

OTHER PUBLICATIONS

P. Simko et al., *Potravinarske Vedy*, 12(3) (1994), pp. 175–184 (abstract only).

Simko et al., *Potravinarske Vedy*, 12(3) (1994), pp. 175–184 (abstract only).

*Primary Examiner*—Arthur L. Corbin
*Attorney, Agent, or Firm*—Marshall, O'Toole, Gerstein, Murray & Borun

[57] ABSTRACT

A method of removing hydrocarbons, such as polynuclear aromatic compounds, like benzo(a)pyrene, from liquid smoke and flavoring compositions by contacting said compositions with a nonionic residue. The method reduces the hydrocarbon concentration by about at least about 80% by weight, and reduces the benzo(a)-pyrene content to about 1 part per billion or less, without adversely affecting the phenolic content of the liquid smoke and flavoring composition.

19 Claims, No Drawings

METHOD OF REMOVING HYDROCARBONS FROM LIQUID SMOKE COMPOSITIONS

CROSS-REFERENCE TO RELATED APPLICATION

This application is a continuation of application Ser. No. 08/536,948, filed Sep. 29, 1995, now abandoned.

FIELD OF THE INVENTION

The present invention is directed to removing hydrocarbons, like polynuclear aromatic compounds, from liquid smoke and flavoring compositions. In particular, the present invention is directed to removing nonpolar hydrocarbons, such as benzo(a)pyrene, from liquid smoke and flavoring compositions without adversely affecting the phenolic content of the liquid composition. The resulting liquid smoke compositions contain 1 ppb (part per billion) or less of benzo(a)pyrene and the total hydrocarbon content is reduced by at least 80% by weight. The liquid smoke compositions are used to color and flavor edible foodstuffs.

BACKGROUND OF THE INVENTION

Using a liquid smoke and flavoring composition, referred to hereafter as "a liquid smoke composition," as a replacement for smoking food by direct contact with wood smoke has become a standard industry practice. When applied to the surface of meats and other proteinaceous foodstuffs, the liquid smoke composition imparts a characteristic smoke flavor and a dark smoked color to a foodstuff. The preparation of a smokehouse-like food-stuff by applying an aqueous liquid smoke composition to a foodstuff requires controlling and balancing many related variables, such as the foodstuff composition, temperature, humidity, processing and contact time, and amount and concentration of applied liquid smoke composition.

Wood smoke itself is a complex and variable mixture of compounds produced during wood pyrolysis, and includes numerous vaporous compounds which are liquids at room temperature. Pyrolysis is a general term for the thermal decomposition of an organic material, such as wood, plants, and fossil fuels, either during combustion or in the absence of combustion. Combustion pyrolysis uses the oxidation or burning of a portion of the organic material to provide the thermal energy required to vaporize and decompose the remainder of the organic material. For pyrolysis without combustion, thermal energy is supplied indirectly from an external source, such as radiation, solid or gaseous heat carriers, or thermal conduction through reactor walls. The energy supplied by an external source vaporizes and decomposes the organic material without directly burning the organic material.

Either method of pyrolysis produces liquids (i.e., condensable vapors), gases (i.e., noncondensable vapors) and solids (i.e., char and ash) in varying proportions depending upon feed material and pyrolysis conditions. The condensed liquids can be further subdivided into water-soluble organic compounds and water-insoluble tars. It is known that the desirable active ingredients for flavoring and coloring foodstuffs are present in the water-soluble condensed liquids.

While there are hundreds of different chemical species present in liquid smoke compositions, the useful water-soluble components of a liquid smoke composition generally are divided into classes based on compounds having distinct functional groups. These classes are acids, carbonyls, phenolics, and basic and neutral constituents. In general, phenolics are the primary flavoring compounds, carbonyls are the primary coloring compounds, and acids are primarily preservatives and pH controlling agents. The acids and carbonyls also make a secondary contribution to flavor and enhance the surface characteristics of smoked foodstuffs.

As discussed hereafter, acids are measured as titratable acidity calculated as acetic acid. Phenolics are calculated as 2,6-dimethoxyphenol, as determined in a modified Gibbs method. Carbonyls are calculated as 2-butanone, as determined in a modified Lappan-Clark method. The procedures for determining carbonyls and phenolics are described in U.S. Pat. No. 4,994,297, incorporated herein by reference.

The color and flavor chemistry of liquid smoke compositions is highly complex, as evidenced by the over four hundred compounds identified as constituents of liquid smoke compositions. Researchers skilled in the art of smoke compositions have concluded that phenolics are the important contributors to smoke aroma and flavor, however, minor amounts of certain other types of compounds can significantly impact both the color and flavor chemistries of a particular liquid smoke composition.

For commercially-produced aqueous liquid smoke compositions, production begins with smoke made by the combustion and pyrolysis of wood in a limited oxygen atmosphere. After pyrolysis, the smoke is collected and fed through a column countercurrent to a flow of recirculating water. A typical commercial liquid smoke composition for surface applications to a foodstuff, like meat, is an aqueous smoke flavoring described in Hollenbeck U.S. Pat. No. 3,106,473. The dilution of the condensable smoke components with water results in the separation of undesirable tars, polymers, and water-insoluble components.

Current conventional pyrolysis methods are characterized by relatively slow thermal reactions which occur at moderate temperatures. In a typical commercial process, for example, a wood feedstock, generally dried ground sawdust, is fed into a pyrolysis reactor at elevated temperatures. A typical average reactor temperature is about 420° C. Depending on the method of heating, the temperature gradient in the pyrolysis reactor varies from about 600° C. at the heater to about 250° C. at the bulk wood surface. Residence times of solids (wood/char) and vapors are about 10 minutes and 1 minute, respectively.

In the preparation of a commercial liquid smoke composition, the water-insoluble tars separate from the liquid smoke composition while the liquid smoke composition is held in a storage tank for a length of several days to several weeks. Water-insoluble hydrocarbons, like polynuclear aromatic compounds, are unavoidable contaminants associated with the pyrolysis of wood. The hydrocarbons settle out of the liquid smoke composition with the tar, and, like the tar, are physically separated from the liquid smoke composition. Typically, the water-insoluble tar then is discarded. As used here and hereafter, the term "hydrocarbon" is defined as a compound containing essentially only carbon and hydrogen, i.e., a compound containing about 95% or more atomic mass units (a.m.u.) of carbon and hydrogen combined.

In addition, due to the presence of organic compounds in the liquid smoke composition, the hydrocarbons do not completely settle out of the composition. If the organic compound content of the liquid smoke solution is low, some hydrocarbons are dispersed, or suspended, in the liquid smoke composition. As the organic compound concentration of the liquid smoke composition increases, a portion of the hydrocarbons actually can be dissolved in the liquid smoke composition. Removing the dissolved hydrocarbons has been difficult to impossible to achieve.

The manufacturing process for a liquid smoke composition, therefore, typically provides a liquid smoke composition containing about 1 to about 1.5 ppb benzo(a) pyrene. Because liquid smoke compositions having a high organic content retain more of the hydrocarbons, concentrated liquid smoke compositions can contain up to about 8 ppb benzo(a)pyrene. Benzo(a)pyrene concentration serves as a marker for total hydrocarbon concentration. Workers in the art assay for benzo(a)pyrene content, and use this assay as an indication of total hydrocarbon concentration.

Many polynuclear aromatic compounds are known carcinogens. Therefore, it is important to reduce the polynuclear aromatic content as much as possible. Specifically, it is important to reduce the concentration of benzo(a) pyrene, which is known as a carcinogen, preferably to about 0.5 ppb or less. However, in the course of reducing the hydrocarbon content, attention also must be paid to other liquid smoke composition constituents, such that advantageous and desirable smoke and flavoring components remain in the liquid smoke composition.

For example, phenolic compounds are important constituents of liquid smoke compositions because they provide flavor. A significant reduction in the total phenolic content of a liquid smoke composition can produce a less flavorful smoke solution. Although phenolic reduction gives a less flavorful smoke solution, a solution with a moderate weight reduction of phenolics, i.e., about 20% by weight or less, retains substantial flavoring components.

Underwood et al. U.S. Pat. No. 4,994,297 discloses a method of preparing a liquid smoke composition having a benzo(a)pyrene content of less than 1 ppb. However, the method disclosed in this patent utilizes a fast pyrolysis method of preparing the liquid smoke composition. Workers skilled in the art have had difficulty in reducing the benzo (a)pyrene content of liquid smoke to less than 1 ppb when the liquid smoke composition is prepared by the traditional slow pyrolysis method. Workers also have had difficulty removing solubilized benzo(a)pyrene from highly concentrated liquid smoke compositions. In addition, workers skilled in the art have had difficulty in further reducing the low amount of hydrocarbons present in a liquid smoke composition prepared by a fast pyrolysis method. The present method is directed to reducing the hydrocarbon content of liquid smoke compositions prepared by either a fast pyrolysis method or a slow pyrolysis method, and in concentrated liquid smoke compositions.

Conventional slow pyrolysis methods produce liquid, gas, and char yields which typically are about 35%, 35%, and 30% of the mass of the wood feedstock, respectively. Because the water-insoluble constituents are between about 50% and about 65% of the total liquids derived from the wood content, the net yield of raw liquid smoke composition is relatively low (i.e., about 12% to about 20% of the wood feedstock).

The slow pyrolysis method of producing liquid smoke compositions, therefore, suffers from relatively low yields of desirable smoke and flavoring compounds, and relatively high yields of undesirable compounds and undesirable by-products, including benzo(a)pyrene. To separate out these undesirable and carcinogenic compounds, the collected condensed vapors are diluted with water. Dilution of the condensed vapors to reduce the level of benzo(a)pyrene below 0.5 ppb prevents the production of liquid smoke having a total acid content above 11% or a browning index above about 13 without a subsequent step of concentrating the liquid smoke composition. Browning index is an important measurement used to characterize a liquid smoke composition. The browning index is a colormetric technique that measures the extent to which carbonyls react with glycine and is used in the smoke flavoring industry to measure the browning performance of a liquid. It would be desirable to have a method of reducing the benzo(a)pyrene content of a liquid smoke composition to 0.5 ppb or less, while maintaining a total acid content above 11% and a browning index above about 13, without having to dilute, then concentrate the liquid smoke composition.

Present-day liquid smoke compositions impart sufficient browning and flavor to foodstuffs. However, present-day methods of preparing liquid smoke compositions require time consuming, and expensive, extra process steps to reduce benzo(a)pyrene content to below 1 ppb. It would be desirable, therefore, to have a method of reducing the benzo(a)pyrene content of liquid smoke compositions to less than 1 ppb in one simple process step, and without having to dilute the liquid smoke composition.

SUMMARY OF THE INVENTION

The present invention relates to methods of removing hydrocarbons from liquid smoke and flavoring compositions. More particularly, this invention relates to methods of reducing the total concentration of hydrocarbons by at least about 80% by weight, and to reducing the concentration of benzo(a)pyrene in liquid smoke compositions to about 1 ppb or less, without adversely affecting the phenolic content of the liquid smoke composition. A treated liquid smoke composition prepared by the present method retains at least about 85%, and preferably about 90%, by weight of the phenolics present in the liquid smoke composition prior to removal of the hydrocarbons.

The hydrocarbons, and especially the polynuclear aromatic compounds, are removed from liquid smoke solutions having a soluble organic compound concentration of about 5 to about 60 brix by contacting the liquid smoke solution with a nonionic, aromatic hydrocarbon-based resin. Contacting the liquid smoke composition with the aromatic, hydrocarbon-based resin provides a treated liquid smoke composition having about 1 ppb or less benzo(a)pyrene and at least about 85%, and preferably at least about 90%, by weight of the original phenolic content. The liquid smoke composition is contacted with the resin at a ratio of about 5 to about 50 volume parts of liquid smoke composition to about 1 weight part of resin, and preferably at a ratio of about 10 to about 40 volume parts of liquid smoke composition to 1 weight part resin.

The method of the present invention reduces the hydrocarbon concentration, and particularly the polynuclear aromatic compound concentration, of the liquid smoke composition, while maintaining a high phenolic concentration. The ability of treated liquid smoke compositions to effectively impart flavor to meats and other foodstuffs is thereby retained. The treated liquid smoke compositions obtained by the present process, therefore, have a good smoke flavor and a significantly reduced concentration of potential carcinogens.

The present method comprises the step of contacting a liquid smoke composition having an organic content of about 5 to 60 brix with a nonionic, aromatic hydrocarbon-based resin, in an amount of about 5 to about 50 milliliters of liquid smoke composition per gram of resin, to reduce the benzo(a)pyrene content of the liquid smoke composition to about 1 ppb or less and to reduce the total hydrocarbon content by at least about 80% by weight, without adversely affecting the phenolic content of the treated liquid smoke composition. As used here and hereafter, the term "without adversely affecting the phenolic content" is defined as a treated liquid smoke composition having a phenolic content of at least about 85%, by weight, of the phenolic content of the liquid smoke composition. Furthermore, as used here and hereafter, the term "treated liquid smoke composition" is defined as the liquid smoke composition after contact with the nonionic resin. The term "liquid smoke composition" refers to a liquid smoke composition prior to contact with the nonionic resin. The term "at least" is defined as the minimum amount of a compound either removed or retained in the liquid smoke composition, and encompasses total removal from or retention in, i.e., up to 100%, the composition.

In accordance with an important aspect of the present invention, the liquid smoke composition can be derived from a fast pyrolysis or a slow pyrolysis method. In either case, the present method reduces the concentration of hydrocarbons in the liquid smoke composition by at least about 80%, and preferably at least about 90%, by weight. Under optimized conditions, reduction of hydrocarbon content by about 100% is envisioned. The nonionic, hydrocarbon-based resins utilized in the present invention are porous resins containing aromatic moieties, and have an average pore diameter of about 50 to about 500 Angstroms (Å), and a specific surface area of at least about 200 m$^2$/g (square meters per gram), and typically about 200 to about 2000 m$^2$/g. The resins have a porosity of at least 40%, and typically about 40% to about 70%, of the bulk volume of the resin.

The treated liquid smoke compositions are applied to foodstuffs to impart flavor and color. Examples of foodstuffs having a treated liquid smoke applied thereto include, but are not limited to, cheese, fish, poultry, and meat, such as beef, pork, or lamb, and casings for food products, including fibrous and nonfibrous casings, like cellulosic or collagen casings.

These and other aspects and advantages of the present invention will become apparent from the following detailed description of the preferred embodiments.

DETAILED DESCRIPTION OF THE PREFERRED EMBODIMENTS

The present invention is directed to a method of treating aqueous liquid smoke and flavoring compositions, and aqueous liquid smoke coloring compositions, with nonionic, aromatic hydrocarbon-based resins to reduce the concentration of benzo(a)pyrene in the liquid smoke composition to about 1 ppb or less, without adversely affecting the phenolic content of the liquid smoke composition. The method provides a treated liquid smoke composition having at least 85% of the phenolic content of the liquid smoke composition, wherein at least 80% of the total hydrocarbons have been removed from the liquid smoke composition. Typically, at least 90%, and up to about 97%, of the total hydrocarbons have been removed from the liquid smoke composition.

The treated liquid smoke compositions, therefore, contain sufficient quantities of phenolics to produce a smoke flavored foodstuff. The process reduces the phenolic content of the liquid composition by about 15% or less, and typically by 10% or less, by weight. To achieve the full advantage of the present invention, the phenolic content is reduced by about 5% to about 8% by weight.

The treated liquid smoke composition also contains less than about 1 ppb of carcinogenic benzo(a)pyrene, and, therefore, can be concentrated, if desired, without posing an undue toxicity hazard. Preferably, the treated liquid smoke solution contains about 0.5 ppb or less of benzo(a)pyrene, and, to achieve the full advantage of the present invention, about 0.3 ppb or less of benzo(a)pyrene. As previously stated, reduction of total hydrocarbon content, and particularly benzo(a)pyrene, allows the treated liquid smoke composition to be concentrated several fold, without exceeding accepted concentration limits for benzo(a)pyrene in liquid smoke compositions.

The aqueous liquid smoke and flavoring compositions used as starting materials in the present method have a sufficient concentration of organic compounds to be about 5 to 60 brix, and preferably about 10 to about 50 brix. To achieve the full advantage of the present invention, the liquid smoke composition is about 15 to about 45 brix.

Brix is an indication of the percentage of soluble organic compounds in aqueous solution. While normally used in measuring sugar solutions, a brix value is an effective approximation of the smoke and flavor components in an aqueous liquid smoke or flavoring composition. The typical brix value above which hydrocarbons and tars become soluble in aqueous liquid smoke compositions is about 35 brix. The present method, however, removes the soluble hydrocarbons from liquid smoke composition having about 35 to about 60 brix. The removal of soluble hydrocarbons from concentrated compositions is an important advancement in the art of liquid smoke compositions.

Persons skilled in the art are aware that there are different ways to contact the nonionic, aromatic hydrocarbon-based resin with the aqueous liquid smoke compositions, like batch and continuous processes. The preferred method of treating aqueous liquid smoke compositions is to pass the liquid smoke composition downwardly through a column of a suitable nonionic, aromatic hydrocarbon-based resin. In this way, a maximum amount of liquid smoke composition is treated with a given amount of resin before resin regeneration is required. For both the batch and the continuous process, to effectively remove hydrocarbons from a liquid smoke composition, without adversely affecting the phenolic content, the ratio of volume of liquid smoke composition to weight of resin (v/w, in ml/g) is about 5 to about 50 to 1, and preferably about 10 to about 40 to 1.

Nonionic, hydrocarbon-based resins suitable for removing hydrocarbons, and especially polynuclear aromatic compounds, from liquid smoke and flavoring compositions are described in the following nonlimiting examples. In general, the resins are crosslinked, aromatic hydrocarbon-based resins having a low polarity, a high porosity, and a high surface area. To achieve the full advantage of the present, the resin is nonpolar, i.e., is free of functional groups. The resins are hydrophobic and selectively remove nonpolar organic compounds, like hydrocarbons, such as benzo(a)pyrene, from aqueous suspensions and solutions. The selective removal of nonpolar compounds permits the liquid smoke composition to retain flavor and coloring constituents such as acid, carbonyls, and phenolics. Preferred nonionic resins are crosslinked divinylbenzene resins, especially divinylbenzene-ethylvinylbenzene copolymers and divinylbenzene styrene copolymers. The resins optionally contain up to about 10% by weight of the resin of a nonionic monomer, such as, for example, an acrylic or methacrylic ester; a diester of an unsaturated dicarboxylic acid, like maleic, fumaric, crotonic, or itaconic acid.

The nonionic, aromatic hydrocarbon-based resins are hard, insoluble beads having a nominal mesh size of about 20 to about 60, a porosity of about 40% to about 70% by volume, a surface area of about 200 to about 2000 m$^2$/g, an average pore diameter of about 40 to about 500 Å, and a density of about 1 to about 1.5 g/ml (gram per milliliter). Preferred aromatic hydrocarbon-based resins have a porosity of about 40% to about 60% by volume, a surface area of about 200 to about 1000 m$^2$/g, and an average pore diameter of about 50 to about 250 Å.

In the following set of examples, various resins were tested for an ability to selectively remove hydrocarbons (e.g., benzo(a)pyrene), as opposed to phenolics, from a commercial liquid smoke composition. The commercial liquid smoke was CHARSOL SUPREME, available from Red Arrow Products Co., Manitowoc, Wis. The CHARSOL SUPREME composition used in the following examples was not filtered after production. CHARSOL SUPREME is a composition of 42 brix.

The unfiltered CHARSOL SUPREME used in the following examples had a benzo(a)pyrene concentration of 3.1 ppb, as determined by the following high performance liquid chromatography (HPLC) method. The following HPLC method also was used to assay for benzo(a)pyrene content of resin treated samples of CHARSOL SUPREME.

A 200 ml (milliliter) sample of CHARSOL SUPREME was added to a 500 ml separatory funnel, followed by 50 ml of spectrophotometric grade isooctane. The resulting mixture was vigorously shaken, allowed to separate, into layers, then the lower, aqueous layer was removed and saved. The solvent layer (i.e., the isooctane layer) was drawn into stoppered flask and saved. The once-extracted CHARSOL SUPREME sample, i.e., the aqueous layer, was returned to the 500 ml separatory funnel, then extracted with a second 50 ml portion of isooctane. The extraction sequence then was repeated two more times. After the fourth extraction, the aqueous layer was discarded. The four isooctane extracts were added to the separatory funnel combined and allowed to sit for five minutes. Then, any aqueous liquid smoke composition that separated from the isooctane was removed.

The 200 ml isooctane extract then was washed three times with 50 ml portions of a 5% aqueous sodium hydroxide solution. The sodium hydroxide solution was discarded after each wash. The isooctane extract next was washed one time with 50 ml 0.2N sulfuric acid, then one time with 50 ml distilled water. The sulfuric acid and water washes also were discarded.

The washed isooctane extract was transferred into a 250 ml. Erlenmeyer flask, then filtered through 20 g (grams) anhydrous sodium sulfate (to remove traces of water) into 250 ml round-bottomed flask. The isooctane extract was evaporated to dryness in a 60° C. water bath under vacuum. The residue was quantitatively transferred with three 5 ml washings of cyclohexane into a 20 cc (cubic centimeter) syringe fitted with a Sep-Pak silica cartridge available from Waters Associates, Milford, Mass., prewetted with cycohexane. The washings were slowly forced through the cartridge with a syringe plunger into a 50 ml evaporation flask. After washing the cartridge one time with 5 ml cyclohexane, the combined washings in the flask were evaporated to dryness under vacuum in a 60° C. water bath. The residue was solubilized in 0.5 ml isooctane.

Twenty microliters of the residue solution then were injected onto an HPLC column. The HPLC apparatus utilizes an isocratic method with a mobile phase of 5% water and 95% acetonitrile (v/v). The HPLC apparatus contains a 3.98 mm×30 cm ODS $C_{18}$ 10$\mu$ (micron) column and a fluorescence detector. Benzo(a)pyrene elutes at 16 minutes, and is detected by fluorescence by excitation at 382 nm and at 405 nm (nanometers). Identification and quantification of benzo(a)pyrene was performed by retention time and peak height, respectively.

The ability of a resin to remove benzo(a)pyrene from a sample of CHARSOL SUPREME (unfiltered) was tested by mixing 5 volume parts (e.g., 25 ml) with one weight part of resin (e.g., 5 g), then stirring the resulting mixture at medium speed for one hour. The CHARSOL SUPREME was filtered from the resin and analyzed for benzo(a)pyrene content. Five different resins were tested for an ability to remove benzo(a)pyrene from CHARSOL SUPREME. The five resins are described in Table I.

TABLE I

| Resin 1 | XUS-40196.00, available from Dow Chemical Co., Midland, MI, Trimethylamine functionalized, chloromethylated copolymer of styrene and divinylbenzene (DVB) in the hydroxide form. (CAS No. 069011-18-3) | |
|---|---|---|
| | Matrix Structure | Microporous styrene/DVB |
| | Type | Strong base, Type I |
| | Physical Form | Hard, white to amber beads |
| | Ionic Form | >93% Hydroxide |
| | Total Capacity | 1.0 meq/ml minimum |
| | Avg. Particle Diameter | 590 ± 50 microns; |
| Resin 2 | XUS-40285.00, available from Dow Chemical Co., Midland, MI, Dimethylamine functionalized chloromethylated copolymer of styrene and divinylbenzene (CAS No. 069011-17-2) | |
| | Total Exchange Capacity | 0.5 meq/ml$^1$ |
| | Moisture | 45–55% |
| | Shrink/Swell | >5% |
| | Density | 1.04 g/cc |
| | Standard Screen Size | 20–50; |
| | Max. Operating temperature in water | 60° C. |
| | Typical Surface Area (m$^2$/g) | 800 |
| | Mean Pore Size, (Angstroms) | 25 |
| Resin 3 | XU-43555.0, available from Dow Chemical Co., Midland, MI, Divinylbenzene, ethylvinylbenzene copolymer (CAS No. 009043-77-0) | |
| | Specific Surface Area m$^2$/g | 800 (minimum) |
| | Avg. Pore Radius, Å | >75 |
| | Porosity, % | >55% |
| | Total Pore Volume, ml/g Particle Size | 1.75 (minimum) |
| | less than 450 | 500 ± 50 microns |
| | more than 550 | <5% |
| | | <5% |
| Resin 4 | XUS-40323.00, available from Dow Chemical Co., Midland, MI, Divinylbenzene, ethylvinylbenzene copolymer (CAS No. 009043-77-0) | |
| | Matrix Structure | Macroporous styrenic polymer |
| | Physical Form | White spheres |
| | Mesh Size | 16–50 |
| | Surface Area, m$^2$/g | 650 |
| | Mean Pore Diameter, Å | 100 |
| | % Porosity (minimum) | 55 |
| Resin 5 | XUS-40283.00, available from Dow Chemical Co., Midland MI, Dimethylamine functionalized chloromethylated | |

TABLE I-continued copolymer of styrene and divinylbenzene
(CAS No. 069011-17-1)

| | |
|---|---|
| Type | Weak base anion |
| Form | Free base |
| Structure | Macroporous styrene/DVB |
| Total Capacity | 1.55 meq/ml min |
| Weak Base Capacity | 1.35 meq/ml min |
| Water Retention Capacity | 40–50% |
| Expansion (%) | about 20% |

[1]milliequivalents per milliliter

After contacting individual samples of CHARSOL SUPREME with a Resin 1 through Resin 5 for one hour, the CHARSOL SUPREME was tested for benzo(a)pyrene content by the above-described HPLC method. The results are summarized in Table II.

TABLE II

| Resin | Benzo(a)pyrene (in ppb) |
|---|---|
| Treated Control | 3.1 |
| Resin 1 | 1.3 |
| Resin 2 | 0.45 |
| Resin 3 | <0.2 |
| Resin 4 | <0.2 |
| Resin 5 | 1.4 |

[1]The lower detectable limit for benzo(a)pyrene is 0.2 ppb. Resins 3 and 4 reduced the benzo (a) pyrene content to less than 0.2 ppb.

As illustrated in Table II, Resins 2 through 4 reduced the benzo(a)pyrene content to less than 1 ppb. Resins 2–4 are nonionic, hydrocarbon-based resins. Resins 3 and 4, which are divinylbenzene ethylvinylbenzene copolymers of high porosity and high surface area, are particularly effective in removing hydrocarbons from a liquid smoke composition. Resins 3 and 4 are nonpolar resins and are hydrophobic. Resin 2 is functionalized with dimethylamine and is a nonionic resin, but has a greater polarity than Resins 3 and 4 (i.e., is of intermediate polarity). Resin 2 is less hydrophobic than Resins 3 and 4. Resins 1 and 5 are in the ionic form and are not as effective in removing hydrocarbons from a liquid smoke composition. Resins 1 and 5 reduced the benzo(a)pyrene content by only about 55% to 60%, whereas Resins 2–4 reduced benzo(a)pyrene content by about 85% (Resin 2), and by greater than 93% (Resins 3 and 4).

P. Simko et al., *Potravinarske Vedy*, 12(3), (1994), pages 175–184, discloses that polynuclear aromatic hydrocarbons, including benzo(a)pyrene, in liquid smoke compositions are absorbed by polyethylene packaging after a one-week storage period. However, P. Simko et al. failed to consider or address whether an aliphatic hydrocarbon-based polymer also removes the desirable components, like phenolics, from a liquid smoke composition.

To determine the ability of an aliphatic hydrocarbon-based resin to remove hydrocarbons from a liquid smoke composition without adversely affecting the phenolic content, the following experiments were performed. Polyethylene and polypropylene beads were obtained from Aldrich Chemical Co., Milwaukee, Wis. The polyethylene beads were high density beads having a weight average molecular weight of about 125,000. The polypropylene beads comprised isotactic polypropylene having a weight average molecular weight of about 250,000.

In separate tests, the polyethylene beads or polypropylene beads were placed in a 50 ml column, then a liquid smoke solution (500 ml) was passed through each column at a rate of about 5 ml/minute. The liquid smoke sample was a 30–35 brix CHARSOL C-10 product, available from Red Arrow Products Co., Manitowoc, Wis.

The liquid smoke composition passed over the polyethylene beads had an initial benzo(a)pyrene concentration of 3.4 ppb. After passing through the column of polyethylene beads, the liquid smoke composition had a benzo(a)pyrene concentration of 3.3 ppb. The aliphatic ethylene-based resin, therefore, removed in insignificant 3% of the carcinogenic benzo(a)pyrene from the liquid smoke composition.

The liquid smoke composition passed over the polypropylene beads had an initial benzo(a)pyrene concentration of 2.0 ppb. After passing through the column of polypropylene beads, the liquid smoke composition had a benzo(a)pyrene concentration of 1.8 ppb. The aliphatic propylene-based resin, therefore, removed in insubstantial 10% of the carcinogenic benzo(a)pyrene from the liquid smoke composition.

The above tests illustrate that useful nonionic hydrocarbon resins are based on an aromatic compound, like styrene or divinylbenzene. The aromatic hydrocarbon-based resin effectively remove the benzo(a)pyrene from liquid smoke compositions. The aliphatic hydrocarbon-based resins failed to remove sufficient amounts of compounds such as benzo (a)pyrene from a liquid smoke compound when the liquid smoke composition is passed through a column. Accordingly, the aliphatic hydrocarbon-based resins either are incapable of effectively removing hydrocarbons from a liquid smoke composition, or require abnormally long contact times that would make the use of an aliphatic hydrocarbon-based resin economically impractical.

As previously stated, liquid smoke and flavoring compositions are complex mixtures containing a variety of classes of compounds. Many of the constituents are necessary to impart color and flavor to treated foodstuffs. Therefore, it is important that the essential smoke and flavoring constituents of the liquid smoke composition, like phenolics, are not removed with the hydrocarbons.

The samples of CHARSOL SUPREME treated by Resins 1 through 5, and an untreated sample, also were analyzed by gas chromatography for the essential smoke and flavoring constituents. The quantitative determination of smoke and flavoring constituents were performed by comparing gas chromatographic peak integrations of a sample with peak integrations of a standard curve generated from a 1% to 5% serial dilution of the smoke and flavoring components in water. Gas chromatograms were run on a Varian Gas Chromatograph Model 3300 equipped with a Varian Integrator Model 4290, fitted with a fused silica capillary column (either a 0.25 mm×60 m J&W DB 1701 column or a 0.25 mm×30 m J&W DB Wax column), and using hydrogen carrier gas at a flow rate of 2.0 ml/mm and a temperature program of 40° C. initial temperature, zero minute hold followed by increasing the temperature at 10° C./minute to 220° C. The injector temperature was 220° C., the detector temperature was 240° C.

The gas chromatograph analysis showed the CHARSOL SUPREME treated with Resins 1, 2, and 5 had substantial amounts of the phenolics removed from the liquid smoke composition. The loss of phenolics was sufficient to adversely affect the ability of CHARSOL SUPREME to flavor a foodstuff. CHARSOL SUPREME treated with Resins 3 and 4 showed a slight decrease in phenolic content, but not a sufficient decrease to adversely affect the ability of CHARSOL SUPREME to flavor a foodstuff, i.e., less than a 20% decrease in phenolic content. The CHARSOL SUPREME samples treated with Resins 3 and 4 contained at least about 85% by weight of the total phenolics present in the untreated sample of CHARSOL SUPREME.

The ability of Resins 3 and 4 to remove hydrocarbons, and particularly polynuclear aromatic compounds, from CHARSOL SUPREME also was tested by the above-described method by mixing 10 volume parts of CHARSOL SUPREME (e.g., 50 ml) with 1 weight part of resin (e.g., 5 g). The benzo(a)pyrene content of each resintreated CHARSOL SUPREME sample was about 0.2 ppb, i.e., about 93.5% reduction in hydrocarbons. At a 10:1 v/w ratio of liquid smoke composition to resin, the amount of phenolics removed from the liquid smoke composition was less than the amount of phenolic removed in the resin treatment using a 5:1 v/w ratio of liquid smoke composition to resin.

Resin 3 again was tested by the above-described method using a 20:1 v/w ratio of CHARSOL SUPREME (e.g., 100 ml) to resin (e.g., 5 g). A complete analysis of untreated CHARSOL SUPREME and CHARSOL SUPREME treated by Resin 3 in this test is summarized in Table III.

TABLE IV

| Sample | Acid (%)[2] | Phenolics (mg/ml)[3] | Browning Index[5] | Carbonyls (mg/ml)[4] | B(a)P (ppb)[1] |
|---|---|---|---|---|---|
| Untreated CHARSOL C-10 | 11.5 | 13.6 | 11.5 | 14.7 | 5.6 |
| CHARSOL C-10 (20:1)[6] | N/A | N/A | N/A | N/A | 0.3 |
| CHARSOL C-10 (30:1) | 11.2 | 12.2 | 11.0 | 14.7 | 0.5 |
| CHARSOL C-10 (40:1) | 11.2 | 12.0 | 10.7 | 14.7 | 0.7 |

[6]ratio of milliliters of CHARSOL C-10 added to grams of Resin 4.

The data summarized in Table IV show a decrease in benzo(a)pyrene of about 87.5% to about 94.5%, to a level substantially below 1 ppb. The data in Table IV also show a reduction in phenolics of only about 10% to about 11.75%, thereby providing a treated liquid smoke composition hav-

TABLE III

| Sample | Acid[2] (%) | Phenolics[3] (mg/ml) | Carbonyls[4] (mg/ml) | Browning[5] Index | pH | B(a)P[1] (ppb) |
|---|---|---|---|---|---|---|
| CHARSOL SUPREME | 13.2 | 25.1 | 24.3 | 19.7 | 2.28 | 3.1 |
| Treated CHARSOL SUPREME (20:1 v/w) | 13.2 | 22.0 | 22.9 | 18.9 | 2.23 | 0.59 |

[1]benzo(a)pyrene
[2]determination of total acidity as acetic acid by potentiometric titration, 2 ml sample was titrated with 0.1N sodium hydroxide (NaOH) to pH 7. using a pH meter, % acid as acetic acid = $\frac{(ml\ NaOH)\ (normality\ NaOH)\ (.001)\ (60)\ (100)}{ml\ sample}$, wherein .001 = conversion factor liter to ml
60 = molecular weight of acetic acid
100 = conversion factor to percent
[3]procedure for determining phenolics is a modified Gibbs method which measures phenolics as 2,6-dimethoxyphenol and is described in Tucker, I. W. "Estimation of Phenols in Meat and Fact," JAOAC, XXV, 779 (1942) and in U.S. Pat. No. 4,994,297, hereby incorporated by reference.
[4]procedure for determining carbonyls is a modified Lappan-Clark method which measures carbonyls as 2-butanone and is described in "Colorimetric Method for Determination of Traces of Carbonyl Compounds," Anal. Chem. 23, 541–542 (1959), and in U.S. Pat. No. 4,994,297, hereby incorporated by reference.
[5]Browning Index is the quantity of potential color-forming substances present per unit of liquid smoke or flavoring composition. The browning index is a relative measure of the ability of carbonyls to react with the amino acid, glycine. Tests have shown good correlation between the browning index values of a liquid smoke composition and the extent of brown color formation on meat surfaces. The determination of browning index is set forth in U.S. Pat. No. 4,994,297, hereby incorporated by reference.

The data summarized in Table III show that contact with a nonionic, aromatic hydrocarbon-based resin reduces the benzo(a)pyrene content from 3.1 to 0.59 ppb, i.e., a greater than 80% decrease, and reduces phenolic content by only about 12% compared to untreated CHARSOL SUPREME. Treating CHARSOL SUPREME with a nonionic, aromatic hydrocarbon-based resin, therefore, effectively removed the polynuclear aromatic compounds, without adversely affecting the phenolic content of the liquid smoke and flavoring composition.

Another liquid smoke composition, CHARSOL C-10, available commercially from Red Arrow Products, Co., Inc., Manitowoc, Wis., was treated with Resin 3 by the above-described method. CHARSOL C-10 contains a lower percentage of smoke and flavoring constituents than CHARSOL SUPREME. In these tests, freshly produced, unfiltered CHARSOL C-10 was treated with Resin 3. The CHARSOL C-10 was mixed with the resin at rates of 20:1, 30:1, and 40:1 volume of liquid smoke to weight of resin. Test results are summarized in Table IV.

ing a substantially reduced hydrocarbon content and a sufficient phenolic content to impart flavor to treated foodstuffs.

In accordance with an important feature of the present invention, it was observed that as the v/w ratio of liquid smoke composition to resin increased, i.e., as the v/w ratio increased from about 5:1 to about 50:1, the amount of phenolics removed from the liquid smoke decreased. Accordingly, to maximize the amount of hydrocarbons removed from the liquid smoke composition, while minimizing removal of phenolics, the v/w ratio of liquid smoke composition to resin is about 5 to about 50 to 1, and preferably about 10 to about 40 to 1. To achieve the full advantage of the present invention, then v/w ratio of liquid smoke composition to resin is about 15 to about 25 to 1.

Another test was performed to determine a sufficient time for the nonionic resin to contact the liquid smoke composition to effectively remove hydrocarbons, like polynuclear aromatic compounds. In this test, seven individual beakers containing a v/w ratio of CHARSOL C-10 to Resin 4 of 40:1 were prepared. The contents in six of the beakers was stirred, and every 10 minutes stirring of one beaker was stopped. All stirring, therefore, was completed in 60 minutes. For each beaker, as soon as stirring was stopped, the contents were filtered, then tested for phenolics and benzo(a)pyrene. The seventh beaker was a control, which was filtered essentially immediately after the CHARSOL C-10 and Resin 4 were added to the beaker, i.e., an elapsed time of 0 minutes. The test results are summarized in Table V.

TABLE V

| Time (min) | Phenolics (mg/ml) | B(a)P (in ppb) | % B(a)P Reduction |
|---|---|---|---|
| 0 | 13.6 | 8.3 | — |
| 10 | 13.6 | 3.9 | 53 |
| 20 | 13.6 | 2.6 | 69 |
| 30 | 12.5 | 2.1 | 75 |
| 40 | 12.8 | 1.7 | 80 |
| 50 | 13.1 | 1.3 | 84 |
| 60 | 12.0 | 0.9 | 89 |

The data summarized in Table V show that a contact time of at least 10 minutes, and preferably at least 20 minutes, substantially reduces the benzo(a)pyrene content. In addition, a contact time of 60 minutes did not adversely affect the phenolic content of the CHARSOL C-10.

Table V illustrates that a 30 to 40 minute contact time was necessary to reduce the hydrocarbon content by about 80%. However, it also was found that for different v/w ratios of CHARSOL C-10 to Resin 4, e.g., 10:1 or 20:1, the contact time to remove at least 80% of hydrocarbons can be as low as 10 minutes. In addition, liquid smoke compositions having a low brix, and treated at a high v/w ratio of liquid smoke composition to resin, can require a contact time of up to about 120 minutes. Accordingly, the contact time varies from about 10 to about 120 minutes, and the specific contact time is related to the brix of the liquid smoke composition and the v/w ratio of liquid smoke composition to resin used in the method.

Accordingly, to effectively remove hydrocarbons from a liquid smoke composition without adversely affecting phenolic content, the contact time between the liquid smoke composition and nonionic, aromatic hydrocarbon-based resin is about 10 to about 120 minutes, and preferably 20 to about 90 minutes. To achieve the full advantage of the present invention, the contact time is about 30 to about 60 minutes.

An addition to the above-described batch process for removing polynuclear aromatic compounds from a liquid smoke composition, a continuous process also can be practiced. In the continuous process, the liquid smoke composition is fed through a column packed with a nonionic, aromatic hydrocarbon-based resin. To provide sufficient contact time between the liquid smoke composition and the resin to effectively remove hydrocarbons, the liquid smoke composition is passed through the resin bed in the column at a rate of about 0.1 to about 2 bed volumes per hour.

To demonstrate the continuous process, a 2 centimeter (cm) inner diameter (I.D.) glass tube (30 cm in length) was fitted with a valve at the bottom of the tube to regulate flow. Glass wool was packed into the bottom of the tube as a barrier to contain the resin in the column. A separatory funnel was fitted with a stopper was positioned at the top of the column to regulate flow of liquid smoke composition entering the column, and thereby maintain a constant liquid level. Resin 3 (23 g) was packed into the column. This amount of Resin 3 (about 25 cc) filled 11 cm of the column. This amount of Resin 3 permits processing of 460 ml of CHARSOL SUPREME or 920 ml of CHARSOL C-10 at predetermined v/w ratios. The flow through the column was adjusted such that the CHARSOL SUPREME flowed through in about 40 to about 50 minutes, and the CHARSOL C-10 flowed through in about 85 to about 95 minutes.

Tests performed with CHARSOL SUPREME and CHARSOL C-10, passed through a column at a v/w ratio of about 10 to about 40 to 1, effectively removed benzo(a)pyrene from the liquid smoke composition, without adversely affecting phenolic content.

To enhance the economic feasibility of the method of the present invention, the resin preferably is capable of being rinsed free of hydrocarbons, and thereby be regenerated for reuse. To illustrate that the aromatic hydrocarbon-based resins utilized in the present method can be regenerated, the columns packed with Resin 3 in the above-described continuous process were subjected to cleaning cycles. Attempts to regenerate the columns using aqueous sodium hydroxide were not effective, and an attempt using concentrated sulfuric destroyed the resin.

However, it was found that a simple washing of the resin with methanol stripped the resin of hydrocarbons and other retained compounds, and returned the resin to its original color and capacity. Residual amounts of methanol in the column after methanol washing are removed by washing the column with water. Other polar solvents that are soluble in water, and preferably having a lower boiling point than water, also can be used to wash and regenerate the resin. Nonlimiting examples are ethanol, isopropyl alcohol, methyl ethyl ketone, and acetone.

To illustrate that commercial quantities of liquid smoke composition can be treated with a nonionic, aromatic hydrocarbon-based resin to remove hydrocarbons, a large column of a suitable resin was prepared. The column was 10 inches in diameter and 6 feet high, and packed with two cubic feet of Resin 3. After preparing the column, the resin first was washed with water. In this test, CHARSOL C-10 then was gravity fed from a holding tank containing freshly prepared CHARSOL C-10 into the column. The feed of CHARSOL C-10 was regulated with a small ball valve to provide a rate of about ⅓ of a gallon of CHARSOL C-10 per minute through the column. The treated liquid smoke composition exiting the column was collected in a small portable tank and later pumped into a larger holding tank. The column was fed for about 25½ hours, during which time 509 gallons of CHARSOL C-10 were treated. This calculates to a v/w ratio of 35 volume parts liquid smoke composition to 1 weight part resin, with a contact time between liquid smoke composition and resin of about 45 minutes. Results of the test are summarized below in Table VI.

TABLE VI

| Sample | Phenolics (mg/ml) | B(a)P (ppb) |
|---|---|---|
| Untreated CHARSOL C-10 | 11.7 | 0.6 |
| Treated CHARSOL C-10 | 11.7 | None detected[7] |

[7]detectable limit is 0.2 ppb, therefore, treated CHARSOL C-10 contains less than 0.2 ppb B(a)P.

The continuous method effectively reduced the benzo(a) pyrene content of CHARSOL C-10 to below the detectable limit of 0.2 ppb, and had no effect on the phenolic content of CHARSOL C-10. The present method, therefore, is effective in further reducing the benzo(a)pyrene content of liquid smoke compositions having an initial concentration of benzo(a)pyrene about 1 ppb or less, such as a liquid smoke composition made by a fast pyrolysis process.

Other resins were tested for an ability to remove hydrocarbons, and especially polynuclear aromatic hydrocarbons, from liquid smoke compositions. The resins are marketed under the tradename AMBERLITE, and are available commercially from Rohm and Haas Co., Philadelphia, Pa. One particular AMBERLITE resin is XAD-16, identified as follows:

| Matrix | Macroreticular crosslinked aromatic polymer |
|---|---|
| Appearance | White translucent beads |
| Particle Size | 0.3 to 1.2 mm (millimeters) |
| True Wet Density | 1.01 g/ml |
| Surface Area | 800 m$^2$/g (minimum) |
| Porosity | 55% (vol/vol) (minimum) |
| Pore Size Range | 2 to 300 Å |

The XAD-16 resin was used to treat CHARSOL C-10 in the continuous process method described above. The XAD-16 resin was used at a v/w ratio of liquid smoke composition to resin of about 40 to 1. Three samples of CHARSOL C-10 were tested. The first sample was treated with virgin XAD-16. The second sample was treated with XAD-16 rinsed one time with methanol. The third sample was treated with XAD-16 rinsed two times with methanol. Results of the tests are summarized below in Table VII.

TABLE VII

| Sample | Acids (%) | Phenolics (mg/ml) | Carbonyls (mg/ml) | Browning | B(a)P (ppb) |
|---|---|---|---|---|---|
| Untreated Control C-10 | 10.9 | 17.0 | 15.0 | 12.2 | 5.6 |
| C-10 Treated With Virgin XAD-16 Resin | 10.7 | 16.7 | 14.7 | 11.0 | 1.1 |
| C-10 Treated With XAD-16 Washed One Time With Methanol | 10.9 | 15.6 | 12.9 | 11.6 | 0.9 |
| C-10 Treated With XAD-16 Washed Two Times With Methanol | 10.7 | 14.7 | 14.9 | 12.0 | 1.2 |

The data summarized in Table VII show that XAD-16 effectively removed polynuclear aromatic compounds from CHARSOL C-10. The amount of benzo(a)pyrene was reduced by about 79% to about 83% compared to the untreated CHARSOL C-10. The XAD-16 resin also removed only about 2% to about 15% of the phenolics present in untreated CHARSOL C-10. The XAD-16 resin, therefore, did not remove sufficient phenolics from the CHARSOL C-10 to adversely affect the liquid smoke composition.

Other AMBERLITE resins, in addition to XAD-16, were tested for an ability to remove benzo(a)pyrene from a concentrated solution of CHARSOL C-10. Conventionally, CHARSOL C-10 is about 25 brix. Concentrated CHARSOL C-10 is abut 33 brix. In each test, 1000 ml of 33 brix CHARSOL C-10 was fed through a column containing 25 g of an AMBERLITE resin (i.e., a 40 to 1 v/w ratio), at a flow rate of about 10 ml per minute.

The tested AMBERLITE resins were XAD-2, XAD-4, XAD-7, XAD-8, and XAD-16. AMBERLITE XAD-2, XAD-4, and XAD-16 are crosslinked aromatic polymers and are nonpolar. AMBERLITE XAD-7 and XAD-8 are acrylic ester-based polymers and are of intermediate polarity. As illustrated below, the nonpolar resins are preferred because of an enhanced ability to remove benzo(a)pyrene from a liquid smoke composition. Test results are summarized in Table VIII.

TABLE VIII

| Resin | Phenolics (mg/ml) | B(a)P (ppb) |
|---|---|---|
| Control (no treatment) | 19.4 | 7.3 |
| XAD-2 | 17.9 | 0.4 |
| XAD-4 | 17.4 | 0.3 |
| XAD-7 | 18.2 | 1.2 |
| XAD-8 | 18.1 | 1.5 |
| XAD-16 | 17.8 | 0.4 |

Table VIII illustrates that the nonpolar aromatic resins outperform the acrylic ester-based resins of intermediate polarity with respect to removing benzo(a)pyrene from 33° brix CHARSOL C-10. The nonpolar aromatic resins removed about 94% to about 96% of the hydrocarbons from the CHARSOL C-10. The acrylic ester-based resins removed about 80% to about 83.5% of the hydrocarbons.

Furthermore, the amount of phenolics present in 33 brix CHARSOL C-10 were not adversely affected by either type of resin. However, the resins of intermediate polarity are known to reduce the phenolic content in liquid smoke compositions of lower concentration than 33 brix. In a 33 brix composition, the organic content is high and the phenolics have tendency to remain in solution during resin treatment. As the brix of the liquid smoke composition is lowered, phenolic solubility is decreased and the phenolics are more easily removed by the acrylate ester-type resins. However, both types of resins effectively remove the benzo(a)pyrene from concentrated liquid smoke compositions.

Resins 6–8 also were tested for an ability to remove benzo(a)pyrene from a liquid smoke and flavoring composition. Resins 6–8 are available from Dow Chemical Co., Midland, Mich. In particular, Resin 6 is Dow XYS-40032, which is a strong cation exchange resin functionalized with active sulfonate groups on a macroporous styrene-divinylbenzene matrix. Resins 7 and 8 are Dow XU-43520 and XU-43555, respectively. Resins 7 and 8 are polymeric absorbent resins.

In tests using Resins 7 and 8, concentrated 33 brix CHARSOL C-10 (1000 ml) was fed through 25 g (i.e., a 40 to 1 v/w ratio) of the resin at a flow rate of 10 ml/minute. In tests using Resin 6, 500 ml of 33 brix CHARSOL C-10 was fed through 25 g of Resin 6 because preliminary experiments showed that Resin 6 has a lower capacity to remove benzo(a)pyrene than Resins 7 and 8. The results of tests using Resins 6–8 are summarized below in Table IX.

TABLE IX

| Resin | Phenolics (mg/ml) | B(a)P (ppb) |
|---|---|---|
| Control (no treatment) | 18.5 | 4.5 |
| Resin 6 | 18.2 | 2.9 |
| Resin 7 | 16.8 | 0.1 |
| Resin 8 | 17.4 | 0.4 |

The data summarized in Table IX shows that the cationic Resin 6 did not effectively remove benzo(a)pyrene from 33 brix CHARSOL C-10 (i.e., about 35% removed). In contrast, nonionic Resins 7 and 8 removed about 98% and about 91%, respectively, of the benzo(a)pyrene from 33 brix CHARSOL C-10, without adversely affecting the amount of phenolics in the 33 brix CHARSOL C-10 (i.e., about 9% and about 6% reduction in phenolics for Resins 7 and 8, respectively).

In another experiment, Resin 3 was used to treat a commercial liquid smoke designated as SMK 5991, available from Hickory Specialties Inc., Brentwood, Tenn. SMK 5991 was mixed with Resin 3 at a 40:1 v/w ratio of liquid smoke composition to resin. Three SMK 5991 samples were tested. One sample was fed through virgin Resin 3. Second and third samples were fed through Resin 3 washed once and twice with methanol, respectively. Results are summarized in Table X.

TABLE X

|  | Acids (v/w) | Phenolics (mg/ml) | Carbonyls (mg/ml) | Browning Index | B(a)P (ppb) |
|---|---|---|---|---|---|
| Control | 11.3 | 18.4 | 17.9 | 13.5 | 3.6 |
| Virgin Resin 3 | 11.0 | 17.4 | 17.5 | 13.5 | 0.8 |
| Resin 3 Washed Once With Methanol | 11.0 | 16.0 | 18.3 | 13.8 | 0.47 |
| Resin 3 Washed Twice With Methanol | 11.0 | 16.7 | 16.4 | 13.1 | 0.37 |

The data in Table X show that Resin 3 effectively removes benzo(a)pyrene from different liquid smoke compositions (i.e., about 70% to about 90% reduction of hydrocarbons), without adversely affecting the concentration of phenolics (i.e., about 5.5% to about 13% reduction of phenolics) in the liquid smoke composition.

Many modifications and variations of the invention as hereinbefore set forth can be made without departing from the spiritual scope thereof and, therefore, any such limitations should be imposed as are indicated by the appended claims.

What is claimed is:

1. A method of removing hydrocarbons from a liquid smoke composition containing phenolics, said method comprising the step of contacting the liquid smoke composition with a nonionic, divinylbenzene-ethylvinlybenzene copolymer resin for a sufficient time and in an amount of about 35 to about 50 milliliters of the liquid smoke composition per gram of the resin to provide a treated liquid smoke composition, wherein at least about 80% of the hydrocarbons are removed from the liquid smoke composition, and the treated liquid smoke composition contains at least 92% of the phenolics present in the liquid smoke composition.

2. The method of claim 1 wherein the hydrocarbons comprise polynuclear aromatic compounds.

3. The method of claim 2 wherein the polynuclear aromatic hydrocarbons comprise benzo(a)pyrene.

4. The method of claim 3 wherein the treated liquid smoke composition has a benzo(a)pyrene content of one ppb or less.

5. The method of claim 3 wherein the treated liquid smoke composition has a benzo(a)pyrene content of 0.5 ppb or less.

6. The method of claim 3 wherein the treated liquid smoke composition has a benzo(a)pyrene content of 0.3 ppb or less.

7. The method of claim 1 wherein at least 90% of the hydrocarbons are removed from the liquid smoke composition.

8. The method of claim 1 wherein at least 95% of the hydrocarbons are removed from the liquid smoke composition.

9. The method of claim 1 wherein the treated liquid smoke composition contains at least 95% of the phenolics present in the liquid smoke composition.

10. The method of claim 1 wherein the liquid smoke composition is about 5 brix to about 60 brix.

11. The method of claim 1 wherein the resin has a porosity of about 40% to about 70% by volume, a surface area of about 200 to about 2000 $m^2/g$, an average pore diameter of about 40 to about 500 Å, and a density of about 1 to about 1.5 mg/ml.

12. The method of claim 1 wherein the resin comprises a crosslinked copolymer.

13. The method of claim 1 wherein the resin is free of functional groups.

14. The method of claim 1 wherein the resin comprises 0% to about 10% by weight of an acrylic ester, a methacrylic ester, a diester of an unsaturated dicarboxylic acid, or a mixture thereof.

15. The method of claim 1 wherein the resin is hydrophobic.

16. The method of claim 1 wherein the resin is nonpolar.

17. The method of claim 1 wherein the liquid smoke composition and the resin are contacted in a batch process for about 10 to about 120 minutes.

18. The method of claim 1 wherein the liquid smoke composition and the resin are contacted in a continuous process, wherein the liquid smoke composition is fed through a column, having a bed containing the resin, at a rate of about 0.1 to about 2 bed volumes per hour.

19. A method of removing hydrocarbons from a liquid smoke composition containing phenolics, said method comprising the step of contacting the liquid smoke composition with a nonionic, divinylbenzene-styrene copolymer resin for a sufficient time and in an amount of about 35 to about 50 milliliters of the liquid smoke composition per gram of the resin to provide a treated liquid smoke composition, wherein at least about 80% of the hydrocarbons are removed from the liquid smoke composition, and the treated liquid smoke composition contains at least 92% of the phenolics present in the liquid smoke composition.

* * * * *